United States Patent [19]

Yu et al.

[11] Patent Number: 4,711,796
[45] Date of Patent: Dec. 8, 1987

[54] POLY(ARYLENE SULFIDE) COATING COMPOSITIONS

[75] Inventors: Michael C. Yu; Roy F. Wright, both of Bartlesville, Okla.

[73] Assignee: Phillips Petroleum Company, Bartlesville, Okla.

[21] Appl. No.: 880,267

[22] Filed: Jun. 30, 1986

Related U.S. Application Data

[63] Continuation of Ser. No. 696,962, Jan. 31, 1985, abandoned.

[51] Int. Cl.$^4$ .............. B05D 1/24; B05D 3/02; C08G 75/14
[52] U.S. Cl. .................. 427/185; 427/379; 427/385.5; 524/381; 524/386; 524/391; 524/406; 524/425; 524/431; 524/432; 528/387; 528/388; 528/389
[58] Field of Search ............ 528/387, 388, 389; 524/431, 432, 406, 425, 391, 381, 386, 609; 427/379, 385.5, 185

[56] References Cited

U.S. PATENT DOCUMENTS

| | | | |
|---|---|---|---|
| 3,354,129 | 11/1967 | Edmonds et al. | 528/388 |
| 3,513,188 | 6/1950 | Macallum | 528/389 |
| 3,524,835 | 8/1970 | Edmonds | 260/79.1 |
| 3,707,528 | 12/1972 | Miles | 260/79 |
| 3,786,035 | 1/1974 | Scoggin | 260/79.1 |
| 3,869,433 | 3/1975 | Campbell | 260/79.1 |
| 3,869,434 | 3/1975 | Campbell | 260/79.1 |
| 3,878,176 | 4/1975 | Moberly | 528/389 |
| 3,884,873 | 5/1975 | Short | 524/609 |
| 3,919,177 | 11/1975 | Campbell | 528/389 |
| 3,988,286 | 10/1976 | Edmonds et al. | 524/609 |
| 4,020,031 | 4/1977 | Merrill | 524/609 |
| 4,025,496 | 5/1977 | Anderson | 260/79.1 |
| 4,145,326 | 3/1979 | Blackwell | 427/385.5 |
| 4,183,840 | 1/1980 | Takahashi et al. | 528/388 |
| 4,350,810 | 9/1982 | Tieszen | 528/388 |
| 4,373,090 | 2/1983 | Edmonds | 528/387 |
| 4,415,729 | 11/1983 | Scoggins | 528/388 |

Primary Examiner—Lewis T. Jacobs
Attorney, Agent, or Firm—Williams, Phillips & Umphlett

[57] ABSTRACT

A poly(arylene sulfide) coating composition, method of preparing the composition, and method of coating are disclosed. The composition comprises a finely-divided poly(arylene sulfide) having from about 75 to about 99 mole percent para-polymerized aromatic units and from about 1 to about 25 mole percent ortho- or meta- polymerized aromatic units and, optionally, from about 0.1 to about 2 mole percent trifunctionally-polymerization aromatic units. The coating resin can be prepared in a polymerization reaction medium containing a molar excess of base, with respect to sulfur present, and can be washed with water at at least about 100° C. to lower the curing temperature of the coating composition. The compositions are particularly suited for application in which curing temperatures of 350° C. or lower are desired.

58 Claims, No Drawings

POLY(ARYLENE SULFIDE) COATING COMPOSITIONS

This application is a continuation of application Ser. No. 696,962, filed Jan. 31, 1985. Abandoned.

BACKGROUND

This invention relates to arylene sulfide polymers and their use as coating materials. In one aspect, the invention relates to the preparation of poly(arylene sulfide)s which are suitable for coating applications in which relatively low-temperature curing is desirable.

Poly(arylene sulfide) resins have properties such as thermal stability and chemical resistance which make the resins useful for coating substrates. Coating-grade poly(arylene sulfide) resins are conventionally prepared in a reaction mixture containing p-dichlorobenzene, sodium hydroxide, a sulfur source such as sodium hydrosulfide, and a polar organic reaction medium such as N-methylpyrrolidone. The resulting poly(p-phenylene sulfide) can be applied to a substrate as a finely-divided solid in slurry and cured by heating in air to form a tough, chemical-resistant coating on the substrate.

In order to form a continuous, smooth coating on the substrate, it is generally necessary to cure the poly(p-phenylene sulfide) at a temperature above about 370° C. Such a cure temperature has the disadvantages of requiring special heating equipment, increasing the cost of the coating procedure, and limiting the substrates and environments with which the coating can be used. Some substrate materials will be degraded by exposure to such a high cure temperature.

It is therefore an object of the present invention to provide new poly(arylene sulfide) coating formulations. It is a further object to provide methods for preparing and treating poly(arylene sulfide) coating resins which reduce the cure temperature of coating formulations in which the resins are employed. It is a further object to provide low-temperature methods of coating a substrate with a poly(arylene sulfide).

SUMMARY OF THE INVENTION

According to the invention, poly(arylene sulfide) coating formulations are prepared comprising a finely-divided poly(arylene sulfide) which comprises from about 75 to about 99 mole percent aromatic units of the form

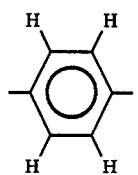

(which will be referred to herein as the "para" aromatic unit) and from about 1 to about 25 mole percent aromatic units of the form

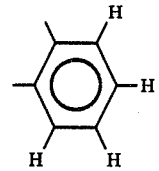

(which will be referred to herein as the "ortho" aromatic unit) or of the form

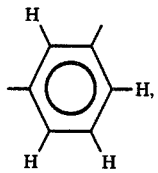

(which will be referred to herein as the "meta" aromatic unit). The poly(arylene sulfide) optionally comprises from about 0.1 to about 2 mole percent of aromatic units of the form

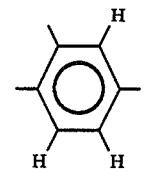

or isomeric forms thereof (which will be referred to herein as the "trifunctional" aromatic unit).

According to an embodiment of the invention, poly(arylene sulfide)s suitable for coating compositions having relatively low cure temperatures are prepared by contacting a sulfur source, a base and aromatic reactants comprising a major amount of a p-dihaloaromatic compound and a minor amount of an o- or m-dihaloaromatic compound, in a polar organic medium containing a molar excess of the base of at least about 10 percent, preferably about 10 percent to about 15 percent, based on moles of sulfur present in the reaction mixture.

According to a further embodiment of the invention, poly(arylene sulfide) resins as described above are recovered from the reaction medium and washed with water at an elevated temperature of at least about 120° C., preferably at least 170° C.

According to a further embodiment of the invention, a method for forming a coating on a substrate is provided, the method comprising applying a coating composition as described above to a substrate and heating the applied composition in an oxygen-containing atmosphere to effect curing of the poly(arylene sulfide). In a preferred embodiment of the invention method, the curing is carried out at a temperature below about 350° C. for a time of about 30 minutes or less.

DETAILED DESCRIPTION OF THE INVENTION

The poly(arylene sulfide) resins suitable for the invention coating compositions comprise a major portion of repeating units of the form

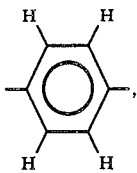

(referred to herein as the "para" aromatic unit) and minor amounts of one or more of the aromatic units of the form

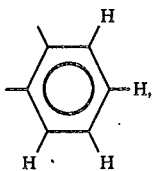

(referred to herein as the "ortho" aromatic unit) and

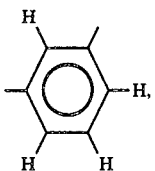

(referred to herein as the "meta" aromatic unit) and, optionally,

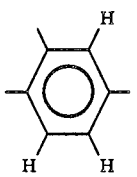

or isomeric variations thereof, referred to herein as the trifunctional aromatic unit. Each of the above-described aromatic units may bear a $C_1$ to $C_3$ alkyl substituent on the aromatic ring.

The para aromatic units are products of the polymerization of p-dihaloaromatic compounds such as p-dichlorobenzene and p-dibromobenzene. The para aromatic units will be present in the poly(arylene sulfide) and in the polymerization reaction mixture in an amount of about 75 to about 99, preferably about 85 to about 98, most preferably about 92 to about 97 mole percent, based on total moles of aromatic units. The meta and/or ortho aromatic units will be present in the poly(arylene sulfide) and in the polymerization reaction mixture in an amount of about 1 to about 25 mole percent, preferably about 2 to about 15 mole percent, most preferably about 2.5 to about 8 percent. The trifunctional aromatic unit, when present, will be present in an amount of about 0.1 to about 2 mole percent, preferably about 0.2 to about 1.5 mole percent, most preferably about 0.4 to about 1.0 percent.

The invention polymerization process is designed to produce poly(arylene sulfide) which exhibits satisfactory cure rates and good coating quality at curing temperatures below about 350° C., preferably below about 330° C., most preferably from about 285° C. to about 330° C., although good cure is obtained at temperatures from about 250° C. to about 425° C., provided the substrate can withstand temperatures in the high end of this range. A reaction mixture containing the following ingredients is prepared to produce the coating resin: from about 75 to about 99 mole percent, based on total moles of aromatic starting materials, of a p-dihaloaromatic compound, such as p-dichlorobenzene; from about 1 to about 25 mole percent of an aromatic compound selected from at least one of an o-dihaloaromatic and a m-dihaloaromatic compound such as o-dichlorobenzene or m-dichlorotoluene, for example; optionally, from about 0.1 to about 2 mole percent of a trifunctional aromatic compound such as 1,2,4-trichlorobenzene; a sulfur source such as sodium sulfide, sodium bisulfide, elemental sulfur or hydrogen sulfide; a base such as an alkali metal or alkaline earth metal hydroxide present in an excess molar amount, with respect to the amount of the sulfur present, optionally an excess amount of about 10 to about 20 percent, preferably about 10 to about 15 percent; and a liquid polar organic medium present generally in an amount of about 2 to about 10 moles per mole of the sulfur source.

It has been found that the use of a molar excess of the basic component of the reaction mixture will produce a copolymer having a lower curing temperature than obtained using the 5 percent molar excess which is conventional in a commercial poly(phenylene sulfide) reaction mixture. In addition, it has been found that the cure temperature of even those copolymers prepared using 5 percent molar excess can be lowered by adding to the reaction mixture a trifunctional aromatic monomer such as 1,2,4-trichlorobenzene. The trifunctional aromatic compound will usually be added to such coating polymers in an amount of about 0.1 to about 2 mole percent, preferably about 0.2 to about 1.5 mole percent, and most preferably about 0.4 to about 1.0 mole percent, based on total moles of aromatic monomers present.

The reaction mixture comprising a sulfur source, a base, the chosen aromatic compounds, and a polar organic medium is maintained under polymerization conditions for a time of about 1 hour to about 10 hours so as to produce a poly(arylene sulfide) copolymer. The reaction mixture can optionally contain a molecular weight modifying additive such as an alkali metal carboxylate. The conditions of polymerization of poly(phenylene sulfide) are known in the art and can be used in preparing the present coating resins, with certain modifications effective for lowering the cure temperature of the resins as expressly set forth herein. The copolymer is recovered from the polymerization reaction mixture by any suitable means such as flash distillation of the polar organic medium or aqueous extraction of the polymer and filtration of smaller particles to recover the solid poly(arylene sulfide) copolymer.

The solid copolymer is then washed, preferably with water at a temperature greater than about 100° C., preferably about 120° to about 250° C., most preferably about 150° to about 200° C. It has been found that use of such hot water for washing the recovered poly(arylene sulfide) produces a coating resin which cures at a lower temperature than a resin washed with water at a lower temperature.

In order to be useful as a coating material, the poly(arylene sulfide) must be in finely-divided form. The coating formulation is generally an intimate mixture of the finely-ground poly(arylene sulfide) and any desired additives selected to modify coating performance or appearance. To achieve particle size reduction and substantially even mixing, a ball or rod mill or the like can be used. The presently preferred particle size reduction method is air milling.

The suitable particle size for the poly(arylene sulfide) will generally be about 60 mesh or smaller for best coating performance. Additives which can be included in the coating formulations include olefin polymers, tetrafluoroethylene polymers, surface active agents, pigments and fillers. Examples of such additives in poly(arylene sulfide) coating compositions include titanium dioxide, ferric oxide, cobaltic oxide, zinc oxide, molybdenum disulfide, graphite, carbon black, calcium carbonate and silica. Such additives will generally be present in the coating composition in an amount of from about 1.5 to about 25 weight percent, based on the weight of the coating composition.

A preferred coating composition will generally contain at least one of the above-described poly(arylene sulfide)s in finely-divided form and from about 1 to about 40 weight percent of titanium dioxide, preferably about 3 to about 30, weight percent. For application of a coating to a substrate by the fluidized bed process, the composition can contain a fluidizing agent such as silica present in an amount of about 0.5 to about 10 weight percent.

The composition will generally be applied to a substrate in a slurry of the finely-divided polymer and additives. The slurry can be applied to the substrate by any suitable method such as brushing, spraying or dipping, and the medium can then be removed by, for example, evaporation prior to or during the curing process. Examples of carrier fluids for the coating composition include water, ethylene glycol, propylene glycol, glycerol, methyl alcohol, ethyl alcohol and isopropyl alcohol. The coating composition can also be applied in a fluidized bed having the finely-divided poly(arylene sulfide) in fluidized state. For any method of coating used, a primer such as cobalt oxide can be applied to the substrate prior to application of the coating composition.

Suitable substrates for application of the coating include any material which can withstand the temperature of curing, such as metal, glass, ceramic and plastics. The substrate can be in any form, including sheeting, wire, coupons and blanks. The compositions are particularly useful for coating wire, as mold release coatings and pipe coatings.

The solid components of the slurry will generally be present in an amount of from about 10 to about 60 weight percent, based on the weight of the slurry, preferably about 20 to about 40 weight percent, although this amount can vary widely and is not critical.

After application to the substrate, the coating composition is cured by heating in an oxygen-containing atmosphere such as air to a temperature above about 250° C. for about 1 minute to about 24 hours. The curing time will depend upon the particular composition, the substrate environment and the temperature of curing, but will usually be within the range of about 8 minutes to about 1½ hours. It is generally desirable for convenience and economy to keep the curing time to no more than about 30 minutes. The invention compositions permit curing at relatively low temperatures within a time of about 30 minutes. The curing is effected in an oxygen-containing atmosphere. If desired, the cured coating can be annealed by heating the coated substrate above about 110° C., preferably about 180° to about 250° C., for about 20 minutes to about 12 hours.

EXAMPLE 1

This example describes the preparation of various poly(phenylene sulfide) coating resins from a reaction mixture containing sodium hydrosulfide and sodium hydroxide.

To a stirred 1-liter autoclave was charged 96.37 grams (1 mole) of 58.18 weight percent aqueous NaSH, 46 grams (1.15 moles) NaOH and 200 grams of N-methyl-2-pyrrolidone. The reactor was closed and heated to 160° C. in about 50 minutes with a slow $N_2$ purge in the vapor phase of the reactor. At about 155° C. water began to distill. The heating was continued to 205° C. during which time about 41 milliliters of liquid was removed. The reactor was cooled to 180° C. and a mixture of 144.06 grams (0.98 mole) of p-dichlorobenzene, 7.35 grams (0.05 mole) of o-dichlorobenzene and 130 grams of N-methyl-2-pyrrolidone was added. The contents were then heated to 235° C. in about 30 minutes, held at 235° C. for 1 hour, heated to 265° C. and held there for 2 hours and then cooled to ambient room temperature. The polymer was removed, washed about 5 or 6 times with warm (80° C.) water, and then put in an autoclave and slurried with about 300 milliliters of deionized water. The slurry was heated to 175° C. in about 30 minutes, held at 175° C. for another 30 minutes during which time the pressure reached 150 psig. The slurry was cooled to room temperature and filtered, and the polymer was dried in a vacuum oven at 80° C. overnight. The product was 100.87 grams (93.4 weight percent yield) of polymer having an inherent viscosity of 0.14 and an ash content of 0.6 weight percent.

The above general procedure was repeated several times using varying amounts of dichlorobenzenes, NaSH and NaOH. The properties of these polymers are listed in Table I. Runs I and J employ m-dichlorobenzene in place of o-dichlorobenzene.

TABLE I

Polymers Prepared

| Polymer Designation | Ingredients, moles | | | | | Polymer Properties | | | | | |
|---|---|---|---|---|---|---|---|---|---|---|---|
| | p-DCB | o-DCB | m-DCB | NaSH | NaOH | I.V.[a] | ER[b] | Tg | Tc | Tm | % Ash |
| A[c] | 1.0 | — | — | 1.0 | 1.05 | — | 30–70 | — | — | — | — |
| B | 1.03 | — | — | 1.0 | 1.15 | 0.16 | — | 83 | 129 | 275 | — |
| C | 0.98 | 0.05 | — | 1.0 | 1.05 | 0.16 | 63 | — | — | — | 0.56 |
| D | 0.98 | 0.05 | — | 1.0 | 1.10 | 0.16 | 73 | — | — | — | 0.32 |
| E | 0.98 | 0.05 | — | 1.0 | 1.15 | 0.11 | 250 | — | — | — | 0.39 |
| F | 0.88 | 0.15 | — | 1.0 | 1.05 | 0.13 | 55 | 84 | 171 | 220 | 0.32 |
| G | 0.88 | 0.15 | — | 1.0 | 1.10 | 0.16 | 30 | — | — | — | — |
| H | 0.87 | 0.15 | — | 1.0 | 1.15 | 0.11 | 235 | 79 | 160 | 220 | 0.61 |
| I | 0.98 | — | 0.05 | 1.0 | 1.05 | 0.17 | 31 | — | — | — | 0.64 |

TABLE I-continued

| Polymer Designation | Polymers Prepared |||||||||||
|---|---|---|---|---|---|---|---|---|---|---|---|
| | Ingredients, moles |||||  Polymer Properties ||||||
| | p-DCB | o-DCB | m-DCB | NaSH | NaOH | I.V.[a] | ER[b] | Tg | Tc | Tm | % Ash |
| J | 0.98 | — | 0.05 | 1.0 | 1.15 | 0.14 | 134 | — | — | — | 0.60 |

[a]Inherent Viscosity, measured on 0.4 weight % solutions in 1-chloronaphthalene at 206° C.
[b]Extrusion Rate, g/10 min, carried out in accordance with test method ASTM D1238, Procedure B modified by employing a temp. of 600° F. (315.6° C.), an orifice of 0.0825 ± .0002 inch diameter × 1.250 ± .002 inch length and a total driving weight including piston of 345 grams.
[c]Uncured commerical Ryton® poly-(p-phenylene sulfide).

EXAMPLE II

This example describes the procedure used to evaluate the polymers prepared in Example I as coating materials. The amount of ingredients varied somewhat between the different coating formulations, but the ratios of ingredients were essentially the same. Thus, a typical coating formulation was prepared by mixing for 5 to 8 minutes in a Waring® blender 18 grams of the polymer, 6 grams of TiO$_2$ and 56 grams of propylene glycol. The resulting slurry was spread with a coating rod over 3 inch×6 inch×0.035 inch cold rolled steel panels precleaned by vapor degreasing or acetone prior to heating the panels in a forced air oven at 370° C. for one hour. The coated panels were placed in a circulating air oven (550°–700° F.) for 30 minutes, removed from the oven and cooled to room temperature. The coating procedure was repeated to provide a second and third coats. After the third coat cooled, the coated panels were bent 180° over a 3/16 inch mandrel. Any cracks or other coating ruptures were noted and the coating was evaluated as follows: 1=excellent to good; 2=micro cracks; 3=cracks; 4=complete rupture. If the coating at this point passed with a rating of 1 or 2, the coating was heated at 450° F. for 2 hours, and this annealed coating was again evaluated using the mandrel bend test.

The results from the mandrel bend test are listed in Table II. PPS copolymers were prepared which required a lower bake temperature (e.g., 301° C.–315° C.) than the normal bake temperature of 370° C. (Polymer A). This was possible through the use of at least 10 mole percent excess NaOH (Polymers D and G) and preferably 15 mole percent excess NaOH (Polymers E and H) during the initial polymerization process. Polymers with less than 10 mole percent excess NaOH (Polymers C and F, with 5 mole percent excess) required a higher bake temperature to pass the bend test. The effect of 5 to 15 mole percent excess NaOH was applicable to copolymers regardless of whether the comonomer is o-dichlorobenzene or m-dichlorobenzene. Likewise, the ratio of p-dichlorobenzene to either o-or m-dichlorobenzene (e.g. 95/5 or 85/15) did not appear to affect the bake temperature.

TABLE II

| | | Coating Data | | | | | |
|---|---|---|---|---|---|---|---|
| | | | Mandrel Bend Test Ratings[b,c] |||||
| | % Excess | | Curing Temperature |||||
| Polymer | NaOH | Polymer[a] | 288° C. | 300° C. | 315° C. | 343° C. | 370° C. |
| A | 5 | Homopolymer | — | — | 1/4 | — | 1/1 |
| B | 15 | Homopolymer | — | — | 3/— | — | 3/— |
| C | 5 | Copolymer (95/5) o- | — | — | 2/4 | — | — |
| D | 10 | Copolymer (95/5) o- | 4/4 | 1/4 | 1/1 | 1/1 | — |
| E | 15 | Copolymer (95/5) o- | 1/3 | 1/1 | 1/1 | 1/1 | — |
| F | 5 | Copolymer (85/15) o- | 4/— | — | 1/4 | 4/— | — |
| G | 10 | Copolymer (85/15) o- | 4/— | — | 1/2 | — | — |
| H | 15 | Copolymer (85/15) o- | 1/4 | — | 1/1 | — | 4/4 |
| I | 5 | Copolymer (95/5) m- | — | — | 1/4 | — | — |
| J | 15 | Copolymer (95/5) m- | 4/1 | — | 1/1 | — | — |

[a]Weight or mole ratios of p-DCB/o-DCB/m-DCB
[b]Coating baked 30 minutes at specified temperatures and cooled to about 80° F. before testing. Ratings: 1 = excellent to good 2 = micro cracks 3 = cracks 4 = complete rupture
[c]Unannealed/annealed at 230° C. for 2 hours; 1/4 means that the rating was "1" for the unannealed coating and "4" for the annealed coating.

Of additional interest was the fact that the excess NaOH appeared to affect the bake temperature only for PPS copolymers and not PPS homopolymers. This is noted with Polymers A and B, for which unacceptable mandrel bend ratings were obtained when bake temperatures below 700° F. were employed. The data appears to suggest that excess NaOH may in some instances be actually detrimental in making PPS homopolymers for coatings since neither a 600° F. or 700° F. bake temperature provided a satisfactory coating when 15 mole percent excess NaOH was used to produce Polymer B.

EXAMPLE III

This example illustrates the effects of the temperature at which phenylene sulfide copolymer resins are washed on the performance of the copolymer coatings.

Two copolymer resins were prepared substantially in accordance with the polymerization procedure of Example I, with the following exceptions:

(a) in both runs, 129.36 grams (0.88 moles) of p-DCB and 22.05 grams (0.15 moles) of o-DCB were used;

(b) in run K, 42.0 grams (1.05 moles) of NaOH and 95.0 grams of aqueous NaSH (1.00 mole NaSH) were employed;

(c) in run L, 44.0 grams (1.10 moles) of NaOH and 95.0 grams of aqueous NaSH (1.00 mole NaSH) were employed;

(d) in run K, the polymerization was carried out at 245° C. for 3 hours;

(e) in run L, the polymerization was carried out for 1 hour at 235° C., for 1 hour at 265° C., and for 1 hour at 280° C.

The copolymers of both runs were washed with water at about 80° C. A portion of the thus washed copolymers (polymers K-1 and L-1) were dried and then tested in coating applications, essentially in accordance with the procedure described in Example II. The second portions of polymers K-1 and L-1 were then washed again at 177° C. The twice-washed copolymer samples (polymers K-2 and L-2) were dried and also tested in coating applications, essentially in accordance with the procedure of Example II. Test results are summarized in Table III.

TABLE III

| Polymer | Washing Conditions | Mandrel Bend Test Rating[1] Unannealed/ Annealed[2] | Surface Appearance[3] Unannealed/Annealed |
|---|---|---|---|
| K-1 | 80° C. | 1/4 | 3/3 |
| K-2 | 80° C./177° C. | 1/1 | 2/2 |
| L-1 | 80° C. | 1/1 | 2/2 |
| L-2 | 80° C./177° C. | 1/1 | 1/1 |

[1] See footnote b of Table II; all coatings were baked at 315° C.
[2] See footnote c of Table II.
[3] Rating of coating appearance before Mandrel Bend Test; rating scale is the same as for Mandrel Bend Test (see footnote b of Table II).

Data in Table III clearly show that those samples of copolymers (prepared with about 15 mole-% o-DCB) which were washed at 177° C., consistently gave better surface appearances in coating applications (annealed or unannealed) than those samples that were washed only at 80° C. In one case, also the "annealed" Mandrel Bend Test rating of the 177° C.-washed polymer sample (K-2) was significantly better than that of the 80° C.-washed polymer sample (K-1).

That which is claimed is:

1. A method for preparing a poly(arylene sulfide) coating composition having a cure temperature of less than about 330° C. over a cure time of less than about 1.5 hours, the method comprising:
   (a) contacting in a reaction mixture about 75 to about 99 mole percent of a para-dihaloaromatic compound, about 1 to about 25 mole percent, based on total moles of aromatic compounds, of an aromatic compound selected from the group consisting of ortho- and meta-dihaloaromatic compound, a sulfur compound, a base, and a polar organic compound, under polymerization conditions thereby producing poly(arylene sulfide), wherein said base is present in a molar excess, with respect to moles of sulfur, of at least about 10 percent;
   (b) recovering solid poly(arylene sulfide); and
   (c) preparing from the recovered solid poly(arylene sulfide) a coating composition comprising the recovered solid poly(arylene sulfide) in finely-divided form.

2. The method of claim 1 in which the base is selected from the group consisting of alkali metal hydroxides and alkaline earth metal hydroxides.

3. The method of claim 2 in which the base is an alkali metal hydroxide and the sulfur compound is selected from the group consisting of sodium sulfide, sodium bisulfide, elemental sulfur, hydrogen sulfide, and mixtures thereof.

4. The method of claim 3 in which the base is sodium hydroxide and the sulfur compound is sodium bisulfide.

5. The method of claim 1 in which the base is present in a molar excess, with respect to moles of sulfur, of about 10 to about 20 percent.

6. The method of claim 5 which further comprises washing the recovered solid poly(arylene sulfide) with water at a temperature of at least about 100° C.

7. The method of claim 5 which further comprises washing the recovered solid poly(arylene sulfide) with water at a temperature of about 150° to about 200° C.

8. The method of claim 1 in which the base is present in a molar excess, with respect to moles of sulfur, of about 10 to about 15 percent.

9. The method of claim 1 in which the reaction mixture further comprises about 0.1 to about 2 mole percent of a trihaloaromatic compound.

10. The method of claim 9 in which the trihaloaromatic compound is 1,2,4-trichlorobenzene.

11. The method of claim 10 in which the 1,2,4-trichlorobenzene is present in an amount of about 0.2 to about 1.5 mole percent.

12. The method of claim 1 in which the para-dihaloaromatic compound is p-dichlorobenzene present in an amount of about 85 to about 98 mole percent, and the aromatic compound selected from the group consisting of ortho- and meta-dihaloaromatic compounds is present in an amount of about 2 to about 15 mole percent and is selected from the group consisting of m-dichlorobenzene and o-dichlorobenzene.

13. The method of claim 12 in which the base is sodium hydroxide present in a molar excess with respect to sulfur of about 10 to about 15 percent.

14. The method of claim 13 in which the polar organic compound is N-methylpyrrolidone.

15. The method of claim 13 which further comprises in said step (c) combining the recovered solid poly(arylene sulfide) with a solid additive selected from the group consisting of olefin polymers, poly(tetrafluoroethylene), titanium dioxide, ferric oxide, cobaltic oxide, zinc oxide, molybdenum disulfide, graphite, carbon black, calcium carbonate, silica, and combinations thereof and wherein said recovered solid poly(arylene sulfide) is predominantly in the form of particles no larger than about 60 mesh.

16. The method of claim 13 which further comprises forming a slurry comprising the coating composition of said step (c) in a carrier fluid.

17. The method of claim 16 which further comprises adding to the coating composition of said step (c) about 3 to about 30 weight percent, based on the total weight of the coating composition, of titanium dioxide.

18. The method of claim 17 in which the carrier fluid is propylene glycol.

19. The method of claim 13 which further comprises adding to the coating composition of said step (c) about 0.5 to about 10 weight percent, based on the total weight of the coating composition, of a fluidizing agent.

20. The method of claim 19 which further comprises fluidizing the coating composition.

21. A composition comprising:
   a finely divided poly(arylene sulfide) according to the process comprising
   (a) contacting in a reaction mixture about 75 to about 99 mole percent of a para-dihaloaromatic compound, about 1 to about 25 mole percent, based on total moles of aromatic compounds, of an aromatic compound selected from the group consisting of ortho- and meta-dihaloaromatic compounds, a sulfur compound, a base, and a polar organic compound, under polymerization conditions thereby producing poly(arylene sulfide), wherein said base is present in a molar excess, with respect to moles of sulfur, of at least about 10 percent;

(b) recovering solid poly(arylene sulfide); and (c) preparing from the recovered solid poly(arylene sulfide) a coating composition comprising the recovered solid poly(arylene sulfide) in finely-divided form, and about 1 to about 40 weight percent, based on the weight of the composition, of a solid additive selected from the group consisting of corrosion inhibitors, pigments, surface active agents, fillers, fluidizing agents, and mixtures thereof.

22. The composition of claim 21 in which the solid additive is present in an amount of about 1 to about 25 weight percent and is selected from the group consisting of olefin polymers, poly(tetrafluoroethylene), titanium dioxide, ferric oxide, cobaltic oxide, zinc oxide, molybdenum disulfide, graphite, carbon black, calcium carbonate, silica, and combinations thereof.

23. The composition of claim 21 in which the poly(arylene sulfide) of the coating composition comprises about 85 to about 98 mole percent para-polymerized aromatic units, and about 2 to about 15 mole percent aromatic units selected from the group consisting of meta-and ortho-polymerized aromatic units.

24. The composition of claim 21 in which the poly(arylene sulfide) of the coating composition comprises about 92 to about 97.5 mole percent para-polymerized aromatic units, and about 2.5 to about 8 mole percent aromatic units selected from the group consisting of meta- and ortho-polymerized aromatic units.

25. The composition of claim 21 in which the poly(arylene sulfide) of the coating composition comprises about 1 to about 25 mole percent ortho-polymerized aromatic units.

26. The composition of claim 21 in which the poly(arylene sulfide) of the coating composition comprises about 1 to about 25 mole percent meta-polymerized aromatic units.

27. The composition of claim 24 in which the solid additive is titanium dioxide present in an amount of about 5 to about 30 weight percent.

28. A composition of claim 21 in which the base is an alkali metal hydroxide present in a molar excess, with respect to moles of sulfur, of about 10 to about 20 percent and the sulfur compound is selected from the group consisting of sodium sulfide, sodium bisulfide, elemental sulfur, hydrogen sulfide, and mixtures thereof.

29. The composition of claim 21 further comprising a carrier fluid selected from the group consisting of water, ethylene glycol, propylene glycol, glycerol, methyl alcohol, ethyl alcohol, isopropyl alcohol, and mixtures thereof.

30. The composition of claim 21 in which the poly(arylene sulfide) of the composition further comprises about 0.1 to about 2 mole percent of a trifunctionally polymerized aromatic unit.

31. The composition of claim 21 in which aromatic units of the poly(arylene sulfide) of the coating composition contain at least one $C_1$–$C_3$ alkyl substituent.

32. The composition of claim 21 in which the finely-divided poly(arylene sulfide) is predominately in the form of 60 mesh or smaller particles.

33. The composition of claim 23 in which the poly(arylene sulfide) further comprises about 0.2 to about 1.5 mole percent of a trifunctionally polymerized aromatic unit derived from the polymerization of a trihalobenzene.

34. The composition of claim 21 in which the base in the reaction mixture is an alkali metal hydroxide present in a molar excess, with respect to moles of sulfur, of about 10 to about 20 percent and the sulfur compound in the reaction mixture is selected from the group consisting of sodium sulfide, sodium bisulfide, elemental sulfur, hydrogen sulfide, and mixtures thereof.

35. The composition of claim 21 in which the poly(arylene sulfide) coating composition is washed with water at a temperature of at least about 100° C.

36. The composition of claim 21 in which the base in the reaction mixture is sodium hydroxide in a molar excess, with respect to moles of sulfur, of about 10 to about 15 percent, and the sulfur compound in the reaction mixture is sodium bisulfide.

37. A method for coating a substrate which comprises:

(a) contacting in a reaction mixture about 75 to about 99 mole percent of a para-dihaloaromatic compound, about 1 to about 25 mole percent, based on total moles of aromatic compounds, of an aromatic compound selected from the group consisting of ortho- and meta-dihaloaromatic compounds, a sulfur compound, a base, and a polar organic compound, under polymerization conditions thereby producing poly(arylene sulfide), wherein said base is present in a molar excess, with respect to moles of sulfur, of at least about 10 percent;

(b) recovering solid poly(arylene sulfide);

(c) preparing from the recovered solid poly(arylene sulfide) a coating composition comprising the recovered solid poly(arylene sulfide) in finely-divided form;

(d) applying to a substrate the coating composition of said step (c); and (e) heating the thus-applied coating composition at a temperature of at least about 250° C. in an oxygen-containing atmosphere for a time effective for curing the poly(arylene sulfide) to produce a cured coating on said substrate.

38. The method of claim 37 in which the solid poly(arylene sulfide) of said step (c) is predominately in the form of particles no larger than about 60 mesh.

39. The method of claim 37 in which the applied coating composition is heated at a temperature in the range of about 250° to about 425° C. for a time of about 1 minute to about 12 hours.

40. The method of claim 39 in which the poly(arylene sulfide) comprises about 85 to about 98 mole percent para-polymerized aromatic units and to about 2 to about 15 mole percent aromatic units selected from the group consisting of meta- and ortho-polymerized aromatic units.

41. The method of claim 40 in which the coating composition of said step (c) is applied as a slurry in a carrier fluid comprising propylene glycol.

42. The method of claim 40 in which the applied coating composition is heated in an oxygen-containing atmosphere at a temperature of about 285° to about 330° C. for a time of about 1 minute to about 30 minutes.

43. The method of claim 42 in which the coating composition of said step (c) further comprises about 3 to about 30 weight percent titanium dioxide.

44. The method of claim 37 in which the poly(arylene sulfide) comprises about 92 to about 97.5 mole percent para-polymerized aromatic units and about 2.5 to about 8 mole percent aromatic units selected from the group consisting of meta- and ortho-polymerized aromatic units.

45. The method of claim 44 in which the applied coating composition is heated in an oxygen-containing atmosphere at a temperature of about 285° to about 330° C. for a time of less than about 30 minutes.

46. The method of claim 39 in which the coating composition of said step (c) further comprises a solid additive selected from the group consisting of olefin polymers, poly(tetrafluoroethylene), titanium dioxide, ferric oxide, cobaltic oxide, zinc oxide, molybdenum disulfide, graphite, carbon black, calcium carbonate, silica, and combinations thereof.

47. The method of claim 46 in which the coating composition of said step (c) is applied as a slurry in a carrier fluid selected from the group consisting of water, ethylene glycol, propylene glycol, glycerol, methyl alcohol, ethyl alcohol, isopropyl alcohol, and mixtures thereof.

48. The method of claim 39 in which the poly(arylene sulfide) of said step (a) further comprises about 0.1 to about 2 mole percent of a trifunctionally polymerized aromatic unit.

49. The method of claim 37 in which the coating composition of said step (c) further comprises silica and is applied to the substrate in a fluidized bed.

50. The method of claim 37 which further comprises applying a cobalt oxide primer to the substrate of said step (d).

51. The method of claim 37 which further comprises annealing the cured coating of said step (e) by heating the cured coating to a temperature of about 110° to about 250° C. for about 20 minutes to about 12 hours.

52. The method of claim 37 in which the base in the reaction mixture is an alkali metal hydroxide present in a molar excess, with respect to moles of sulfur, of about 10 to about 20 percent and the sulfur compound in the reaction mixture is selected from the group consisting of sodium sulfide, sodium bisulfide, elemental sulfur, hydrogen sulfide, and mixtures thereof.

53. The method of claim 37 in which the base in the reaction mixture is sodium hydroxide in a molar excess, with respect to moles of sulfur, of about 10 to about 15 percent, and the sulfur compound in the reaction mixture is sodium bisulfide.

54. The method of claim 37 which further comprises washing the recovered poly(arylene sulfide) of said step (b) with water at a temperature of at least about 100° C.

55. A method for preparing a poly(arylene sulfide) coating composition having a cure temperature of less than about 330° C. over a cure time of less than about 1.5 hours, the method comprising:
  (a) contacting in a reaction mixture about 75 to 99 mole percent of a para-dihaloaromatic compound, about 0.1 to 2 mole percent, of a trihaloaromatic compound, about 1 to 25 mole percent, based on total moles of aromatic compounds, of an aromatic compound selected from the group consisting of ortho- and meta-dihaloaromatic compounds, a sulfur compound, a base and a polar organic compound, under polymerization conditions thereby producing poly(arylene sulfide), wherein said base is present in a molar excess, with respect to moles of sulfur, of at least about 5 percent;
  (b) recovering solid poly(arylene sulfide) of lower cure temperature as compared to poly(arylene sulfide) prepared under essentially identical conditions except without the trihaloaromatic compound and the 5% excess base; and
  (c) preparing from the recovered solid poly(arylene sulfide) a coating composition comprising the recovered solid poly(arylene sulfide) in finely-divided form.

56. The method of claim 55 in which the base is an alkali metal hydroxide and the sulfur compound is elected from the group consisting of sodium sulfide, sodium bisulfide, elemental sulfur, hydrogen sulfide, and mixtures thereof.

57. The method of claim 56 in which the base is sodium hydroxide and the sulfur compound is sodium bisulfide.

58. The method of claim 55 which further comprises washing the recovered solid poly(arylene sulfide) of (b) with water at a temperature of at least about 100° C.

* * * * *